United States Patent [19]

Arnett

[11] Patent Number: 4,753,473
[45] Date of Patent: Jun. 28, 1988

[54] GRIPPER FOR ROBOTIC APPARATUS

[76] Inventor: Edward M. Arnett, 2529 Perkins St., Durham, N.C. 27706

[21] Appl. No.: 89,072

[22] Filed: Aug. 25, 1987

[51] Int. Cl.⁴ .............................................. B25J 15/04
[52] U.S. Cl. ................................... 294/104; 294/19.1; 901/39
[58] Field of Search ................. 294/11, 19.1, 22, 50.9, 294/104, 111; 901/31, 36, 39

[56] References Cited

U.S. PATENT DOCUMENTS

| | | |
|---|---|---|
| 334,667 | 1/1886 | Kircher . |
| 407,426 | 7/1889 | Wisdon ........................ 294/19.1 X |
| 567,468 | 9/1896 | Gregory . |
| 858,492 | 7/1907 | Ward . |
| 1,846,968 | 2/1932 | Kablanow .......................... 294/19.1 |
| 2,807,495 | 9/1957 | Pillstrom ........................ 294/19.1 X |
| 2,905,498 | 9/1959 | Lunde . |
| 3,146,015 | 8/1964 | Roberge . |
| 3,565,479 | 2/1971 | Womack .......................... 294/19.1 |
| 3,591,226 | 7/1971 | Elmore et al. . |
| 3,620,095 | 11/1971 | Dane . |
| 3,972,555 | 8/1976 | Tryon . |
| 4,426,661 | 1/1981 | Pinson . |
| 4,615,555 | 10/1986 | Bateham . |

FOREIGN PATENT DOCUMENTS 2081170 2/1982 United Kingdom ............... 294/19.1

Primary Examiner—Johnny D. Cherry
Attorney, Agent, or Firm—Richard E. Jenkins

[57] ABSTRACT

A gripper for a remotely controlled material handling apparatus. The gripper includes two cooperatively movable gripping jaws engaged by the support arm of the material handling apparatus, and a control cable secured at one end to one of the pair of jaws and at the other end to the remote control apparatus to facilitate opening and closing of the jaws about an object of interest. The jaws are adapted for being secured to the support arm of the handling apparatus in either a horizontal gripping position or in a vertical gripping position.

7 Claims, 4 Drawing Sheets

GRIPPER FOR ROBOTIC APPARATUS

DESCRIPTION

1. Technical Field

The present invention relates generally to remotely controlled material handling apparatus and more particularly to an improved gripper for use with such a robotic apparatus.

2. Background Art

The prior art includes a number of robotic handling devices intended to perform repetitive functions by means of complex mechanical movements and/or programming circuitry, but these apparatus are typically complex and expensive machines which are not adapted for remote control manipulation nor intended for a mass market. Applicant has previously invented a simple apparatus for handling hazardous materials in order to overcome the prior art shortcomings, and this invention is now the subject matter of U.S. Pat. No. 4,652,204.

In laboratory utilization of applicant's prior invention, applicant has now developed an improved gripper therefor which could also be adapted for use in other remotely controlled material handling apparatus or robots. The improved gripper is simple and inexpensive but results in enhanced gripping capabilities. Moreover, the gripper is constructed so that it can engage an object to be manipulated with either a horizontal or vertical gripping action.

DISCLOSURE OF THE INVENTION

In accordance with the present invention, applicant provides an improved gripper for a remote control material handling apparatus which is of unusually simple and inexpensive construction. The gripper is particularly well suited for use with a low cost, and perhaps disposable, material handling apparatus or robot intended for use by a mass market. The gripper comprises a pair of cooperatively movable gripping jaws wherein the first of said jaws is supportingly engaged by the support arm of a material handling apparatus and the second of the jaws is movable toward and away from the first jaw. A control cable is secured at one end to the second jaw and at the other end to the remote control means for the material handling apparatus to facilitate handling of an object by the gripper of the present invention.

Therefore, it is a primary object of the present invention to provide a simple and inexpensive gripper for a remotely controlled material handling apparatus or robot.

Another object of the present invention is to provide an improved gripper for a simple and inexpensive remotely controlled material handling apparatus or robot which will allow for either vertical or horizontal engagement by the gripper.

Further features and advantages of the invention will become more readily apparent from the following detailed description when taken in conjunction with the accompanying drawings.

BEST MODE FOR CARRYING OUT THE INVENTION

Figure 1:
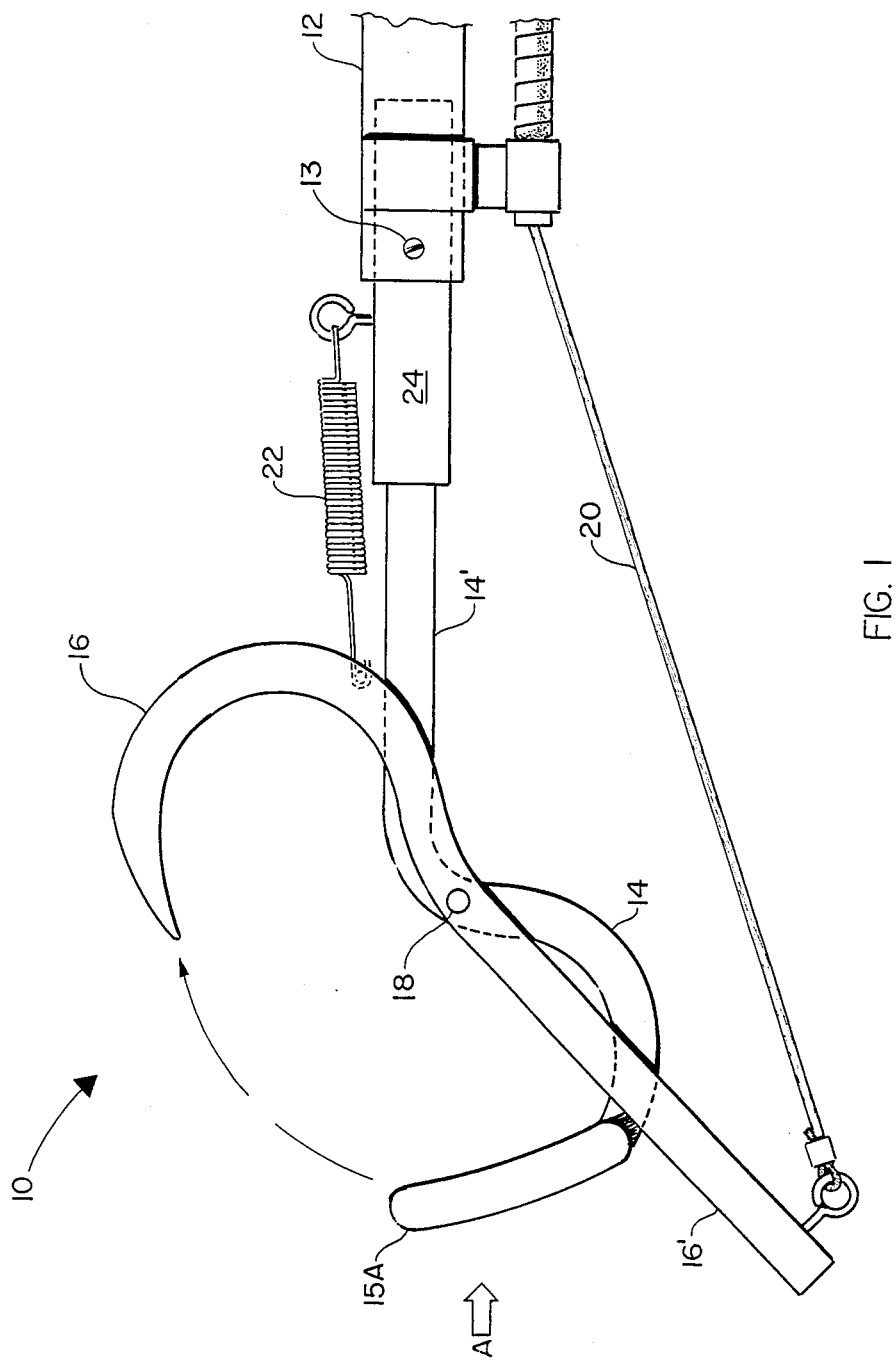
FIG. 1 is a plan view of the gripper of the present invention in its normally open position.
Figure 3:
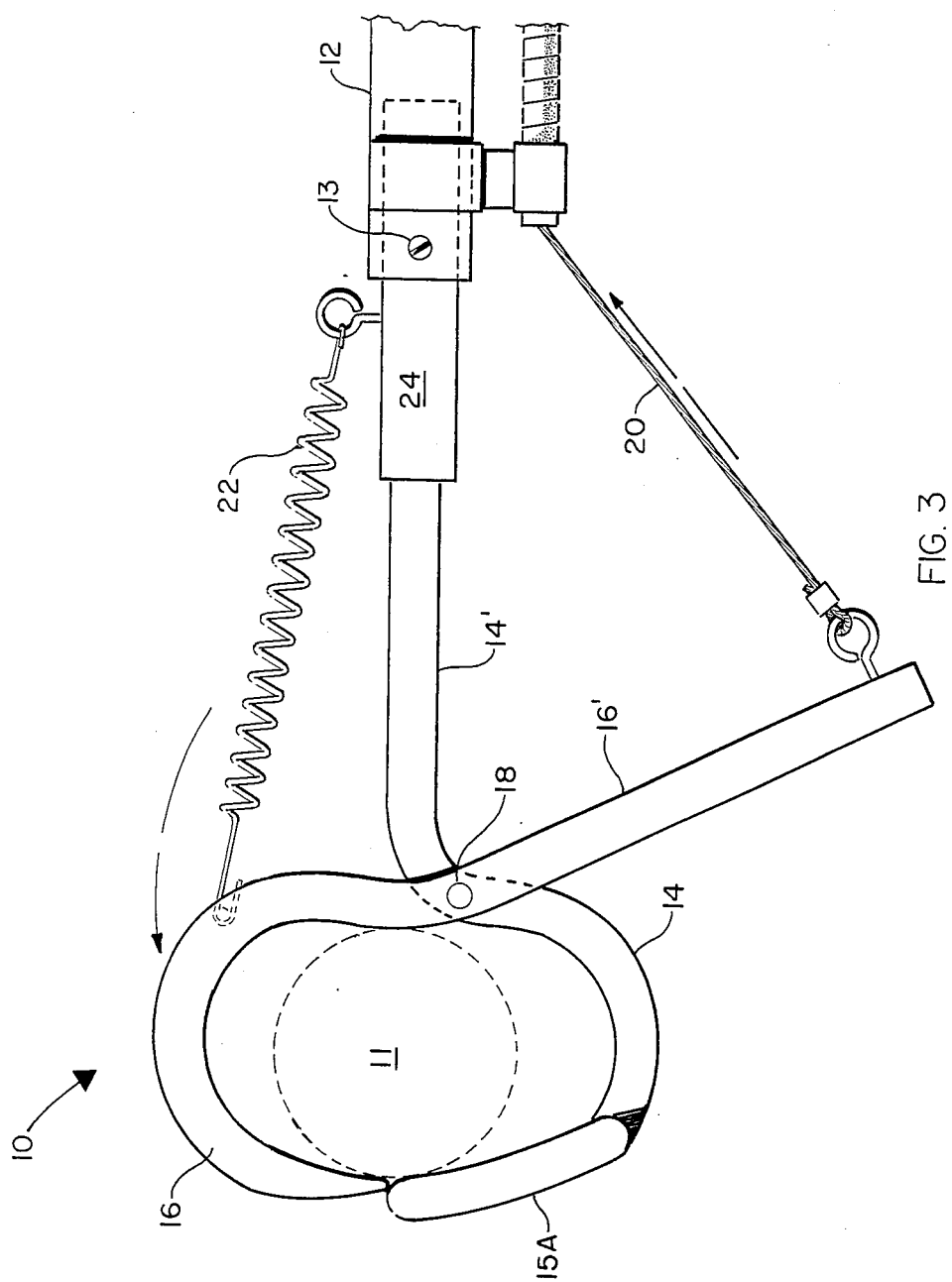
FIG. 3 is a plan view of the gripper of the present invention in its closed position wherein a cylindrical object has been engaged.

Referring now to the drawings, there is shown a gripper 10 which is open in FIG. 1 and closed about an object of interest 11 in FIG. 3. The object 11 may be a hazardous material container, an explosive or other hazardous material which must be engaged and manipulated in some fashion for safe removal and disposal.

Figure 4:
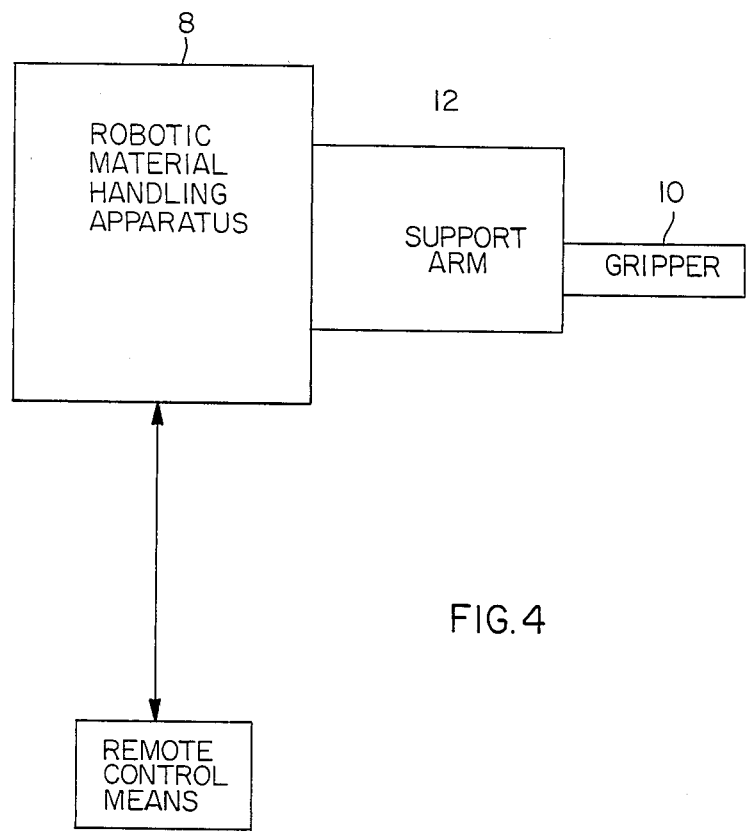
FIG. 4 is a schematic view of the remote control robotic material handling apparatus, support arm and gripper.

Gripper 10 is supported and adjustably positioned by support arm 12 which extends from a remotely controlled material handling apparatus or robot 8 (see FIG. 4). Typically, support arm 12 would be capable of vertical, horizontal and pivotal manipulation by the associated material handling apparatus or robot 8.

Figure 2:
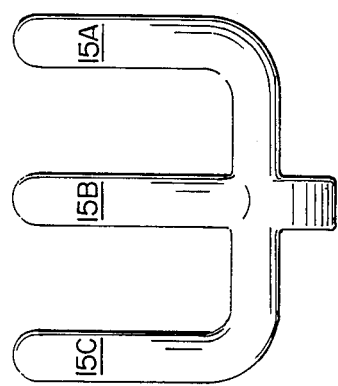
FIG. 2 is a front view in the direction of Arrow A in FIG. 1 of the gripper fingers of the gripper of the present invention.

Gripper 10 comprises a first jaw 14 having an elongate base 14' which is slidably received and secured to support arm 12 by any suitable means such as set screw 13 or the like. A second jaw 16 having an elongate base 16' is pivotably secured to first jaw 14 by a suitable fastener 18 such as a screw and nut which allow second jaw 16 to freely pivot about fastener 18 from an open position (see FIG. 1) to a fully closed position (see FIG. 3). First jaw 14 most suitably has three fingerlike elements 15a–15c (see FIG. 2) at its gripping end to facilitate engagement with cylindrical or other elongate objects and to prevent rotation or twisting thereof between jaws 14 and 16.

A control cable 20, most suitably a coaxial cable, is connected to elongate base 16' of second jaw 16 and at its other end is operably connected to the remote control means (not shown) for the material handling apparatus 8 associated with the gripper. As can be fully appreciated with reference to the drawings, when control cable 20 is extended (see FIG. 1) jaws 14 and 16 of gripper 10 are fully opened and when control cable 20 is withdrawn (see FIG. 3) the jaws of gripper 10 are closed about an object to be manipulated. A spring 22 is provided in order to urge jaws 14 and 16 into a normally open position (see FIG. 1). Spring 22 is connected at one end to second jaw 16 and at the other end to elongate base 14' of first jaw 14. In this fashion, spring 22 tends to resist retraction of control cable 20 by which gripper 10 is closed and to facilitate extension of control cable 20 by which jaws 14 and 16 of gripper 10 are opened. Although simple in construction, gripper 10 allows for controlled engagement and manipulation of a hazardous material or the like.

Although FIGS. 1 and 3 depict gripper 10 in plan view wherein first jaw 14 and second jaw 16 are positioned to horizontally grip an object of interest, applicant's gripper 10 is constructed so that elongate base 14' may be slidably removed from support arm 12, pivoted 90 degrees about its longitudinal axis, and then again slidably secured to support arm 12 in order that gripper 10 may be positioned to apply a vertical gripping motion, as needed, to an object of interest. It is a matter of design choice with respect to how to construct elongate base 14' to accomplish the 90 degree pivotable adjustment, but applicant presently contemplates that elongate base 14' defines an end portion 24 having a square cross section which may be matingly received by support arm 12 which most suitably defines a square cross sectional chamber therein to receive end portion 24. However, other means to allow for a 90 degree pivotal adjustment of gripper 10 substantially about its longitudinal axis are clearly contemplated.

It will be understood that various details of the invention may be changed without departing from the scope of the invention. Furthermore, the foregoing description is for the purpose of illustration only, and not for the purpose of limitation—the invention being defined by the claims.

What is claimed is:

1. In a remote control robotic material handling apparatus of the type having a laterally extending support arm with a gripper secured to the end thereof, said support arm being adapted for manipulation by remote control means, the improvement wherein said gripper comprises a pair of cooperatively movable gripping jaws each having an elongate base, the base of a first jaw being removably engaged by said support arm and a second jaw being pivotably movable toward and away from said first jaw, a control cable secured at one end to the elongate base of said second jaw and at the other end to said remote control means so that extension and retraction of said control cable will result in opening and closing, respectively, of said pair of jaws, and a spring element secured at one end to said second jaw and at the other end to the elongate base of said first jaw so as to urge said pair of jaws into a normally open position.

2. The apparatus according to claim 1 wherein said elongate base of said first jaw is adapted to be slidably removed from said support arm, pivoted 90 degrees about its longitudinal axis, and then slidably secured again to said support arm to facilitate both horizontal and vertical gripping by said gripper.

3. The apparatus according to claim 1 wherein said first jaw defines a plurality of spaced-apart fingers.

4. In combination with a robotic material handling apparatus of the type adapted to manipulate a support arm by a remote control, a gripper comprising:

a support arm defining a square cross sectional open chamber at one end thereof;

a first jaw having an elongate base and defining an end portion with a square cross section, said end portion adapted to be matingly positioned within said chamber of said support arm;

securement means attached to said cross sectional chamber for securing the end portion of said elongate base member of said first jaw within said chamber;

a second jaw having an elongate base and being pivotably secured to said first jaw;

a control cable secured at one end to the elongate base of said second jaw and at the other end to said remote control of said robotic material handling apparatus; and a spring element secured at one end to said second jaw and at the other end to the elongate base of said first jaw;

whereby the spring element urges the second jaw away from the first jaw and extension and retraction of said control cable will result in movement of the second jaw away from and toward the first jaw, respectively, and whereby the elongate base member of the first jaw may be removed from said support arm, pivoted 90 degrees about its longitudinal axis, and then again secured to said support arm so as to provide for both horizontal and vertical gripping motion as needed.

5. A gripper according to claim 4 wherein said first jaw defines a plurality of spaced-apart fingers.

6. A gripper according to claim 4 wherein said control cable is a coaxial cable.

7. A gripper according to claim 4 wherein said securing means is an adjustable screw.

* * * * *